April 27, 1954     E. KERN     2,677,089
SYSTEM OF SPEED CONTROL FOR ELECTRIC MOTORS
Filed Oct. 18, 1951
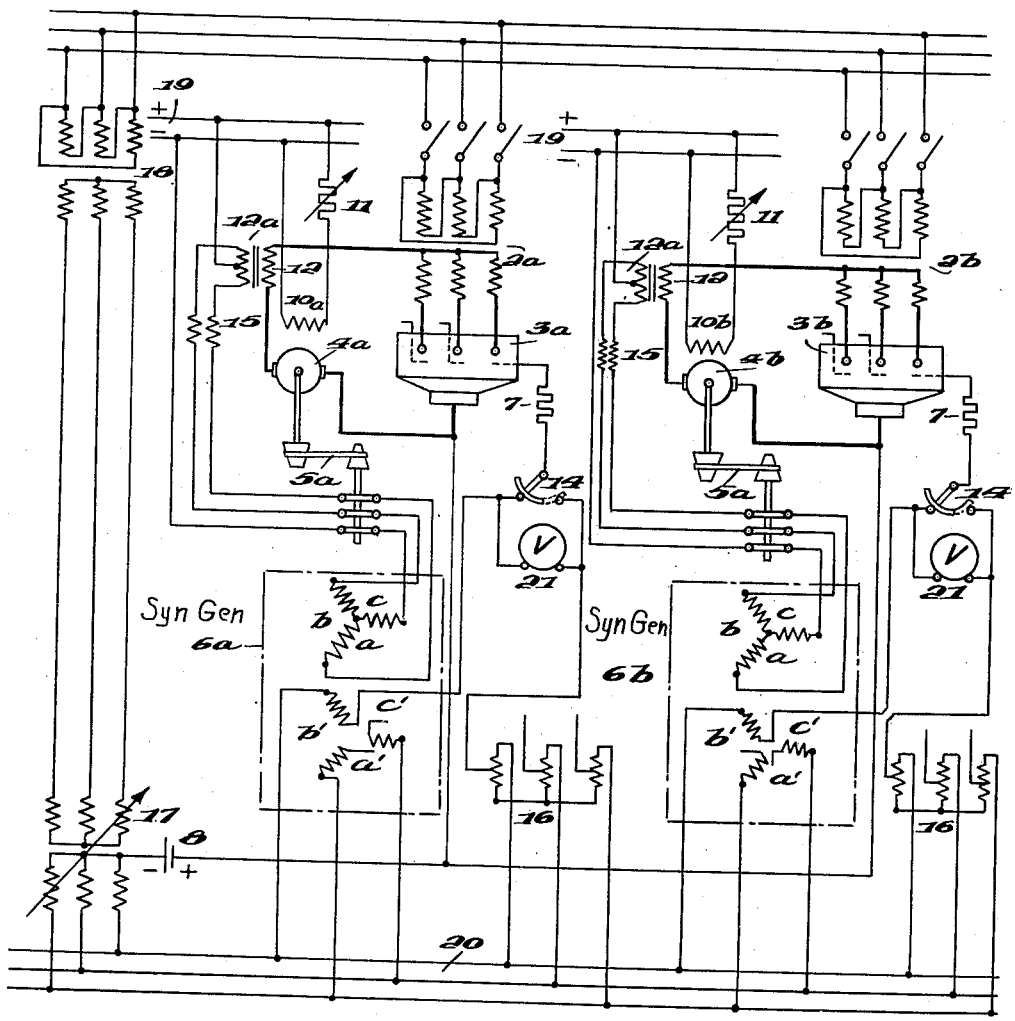
INVENTOR
ERWIN KERN,
BY Pierce, Scheffler & Parker.
ATTORNEYS Patented Apr. 27, 1954

2,677,089

UNITED STATES PATENT OFFICE 2,677,089

SYSTEM OF SPEED CONTROL FOR ELECTRIC MOTORS

Erwin Kern, Ennetbaden, Switzerland, assignor to Aktiengesellschaft Brown, Boveri & Cie, Baden, Switzerland, a joint-stock company Application October 18, 1951, Serial No. 251,932

Claims priority, application Switzerland October 25, 1950

5 Claims. (Cl. 318—314)

The present invention relates to systems for controlling the speed of electric motors and in particular to an improved arrangement for operating a plurality of direct current motors at a constant speed.

In rolling mills and the like wherein steel strip, for example, passes continuously through a plurality of roll stands in succession it is obviously essential that the electric motor drive at each roll stand run at a constant speed independently of the load. Various types of speed regulators have been devised for this purpose, the most general of which provide automatic control over the field or armature voltage of the direct current drive motors. Usually the regulator works on a comparison or null principle wherein some factor variable in amplitude with the actual motor speed is compared with a similar "standard" or "reference" factor whose amplitude is representative of the speed desired to be maintained, and any difference therebetween, signifying a departure in motor speed from the desired value, is utilized to bring about the proper speed correction. Comparison factors commonly used are direct voltages, direct current, and alternating currents of variable frequency. In all cases, however, the regulating apparatus is quite complex and expensive to manufacture.

The present invention provides a type of control where the comparison factor is frequency but is far simpler than others which have been developed hereinbefore in that the "reference" comparison factor is constituted by the constant frequency of an alternating current power network which supplies power to the electric motors through a rectifier system of the grid-controlled discharge tube type. The network frequency which is always maintained at a substantially constant value for the benefit of the customers utilizing the network is compared with the frequency of a small tachometer type synchronous alternating current generator driven by the motor to be regulated. When the motor speed agrees with the speed desired to be maintained, the frequency of the voltage produced by the motor driven generator is equal to that of the network voltage but displaced in phase by an angle between the limits of 90° and 270°. The vector sum of the generator and network voltages is utilized to control the time at which the rectifier grids fire the tubes and such timing of course regulates the amount of power delivered to the drive motors.

The phase displacement between the two voltages, and hence also the phase of their vector sum, remains constant when the motor is running at its proper speed but any change in the latter is reflected by a change in the phase displacement which in turn is reflected by a change in the phase of the vector sum of the two voltages which brings about a corrective change in the firing instants of the rectifiers and hence also a corrective change in the power supplied to the drive motors.

With reference now to the drawings, Fig. 1 is a schematic electrical circuit diagram illustrating one practical embodiment of the improved speed regulating system, and Fig. 2 is a vector diagram showing the relationship between various voltages which form part of the control system.

According to Fig. 1, the direct current drive motors which are to be regulated for operation at a constant speed are designated 4a and 4b. As previously explained, each motor drives the rolls of a particular roll stand and the material being rolled may be steel strip, steel sheeting, paper sheeting, etc. Power to the armatures of these motors is supplied from a multi-phase, alternating current network 1 by rectification through multi-phase grid-controlled rectifier devices 3a, 3b and multi-phase transformers 2a, 2b.

The field windings 10a, 10b of the motors 4a, 4b are separately excited from an auxiliary direct current source 19 through an adjustable resistance 11.

The shafts of motors 4a, 4b are connected to the shafts of three-phase synchronous generator tachometers 6a, 6b through variable speed transmissions 5a, 5b illustrated typically as being of the cone and belt type. The three rotor field windings a, b, c of generator 6a are supplied from the auxiliary direct current source 19 through resistances 15, and a winding 12a, inductively coupled to a choke 12, is also connected in the supply circuit to these windings for a purpose to be later explained. A similar supply circuit, not illustrated, is arranged for the rotor windings of tachometer generator 6b.

The stator windings a', b', c' of generators 6a are series connected respectively with the phases of an auxiliary three-phase alternating current network 20 common to all drive motors which is supplied from network 1 through three-phase transformers 18 and 17 connected in series.

The phase voltages on network 20 are combined with the voltages produced by their respectively associated stator windings on the tachometer generator 6a and led through a multi-pole switching device 14 and through a grid resistor 7 which sets the timing for the grids of the multi-phase rectifier supplying the armature current for motor 4a. To simplify illustration, the connections from stator winding b' through switch 14 to the rectifier control grid only have been included on the drawing. A similar arrangement of connections, not illustrated, is of course provided for the other stator windings a', c' of tachometer generator 6a between the other phases of network 20 and their corresponding grids of the rectifier device 2a. A similar arrangement of connections is provided for tachometer generator 6b. Rectifiers 3a, 3b are each biased negatively by a direct voltage source 8 connected between the rectifier cathode and transformer 17.

The transmissions 5a, 5b are so adjusted individually that at the selected speed desired to be maintained for the motor associated therewith, the frequency of the voltage produced by the synchronous generators 6a, 6b will equal that of the supply network 1 and auxiliary network 20. Moreover, in accordance with the invention, the voltage produced by the generators 6a, 6b must be displaced in phase with respect to the voltage of network 20 as shown in the vector diagram of Fig. 2 by an angle $\beta$ which, dependent upon the regulating condition, will lie between 90° and 270°.

In Fig. 2, if vector $U_N$ be the voltage of network 20 and vector $U_{T0}$ represent the voltage of the tachometer generator 6a or 6b, their vector sum represented by vector $U_{so}$, is the voltage led through switch 14 to the rectifier control grid. It will be observed from the particular vector relationship shown in Fig. 2 that voltage $U_{T0}$ lags the auxiliary, comparison voltage $U_N$ by about 150°. The control, or sum voltage then has the phase position of vector $U_{so}$. Let it be assumed that such a phase relationship is indicative of the fact that the drive motor 4a or 4b is running at the proper speed. Should it now happen that the speed of a drive motor such as 4a fall below that sought to be maintained, then the tachometer voltage vector $U_{T0}$ will undergo a phase displacement equal to angle $\phi_m$ in the direction of a lag which increases with time, that is, in the direction of the arrow $f$. As a result of the original phase displacement of 150° between the voltage components $U_N$ and $U_{T0}$ however, the resulting control voltage $U_{so}$ shifts with respect to time in the opposite direction through an angle $\phi_s$, that is, in the direction of a time advance. The effect of such a shift in phase upon the action of the grid controlling resistor 7 is to cause the grids of the rectifier 3a to ignite earlier and thereby increase the current supplied to the armature of motor 4a. The increase in current results in a corresponding increase in motor speed until the latter reattains the speed desired to be maintained at which time the voltage vector $U_{T0}$ will also have come to rest with respect to time in a new position such as indicated by the broken line vector $U_{T1}$. Should the deviation in motor speed be in the opposite sense, the control system will function in the opposite sense to retard the ignition point of rectifiers 3a resulting in a decrease in current to motor 4a until the latter has been slowed down to its proper speed.

The ratio of the phase angles $\phi_s$ and $\phi_m$ will be dependent upon the relationship between the magnitudes selected for the constant reference voltage vector $U_N$ and the tachometer generator voltage vector $U_{T0}$. With a constant transmission ratio at the drives 5a, 5b, any speed selected for motors 4a, 4b will be maintained so long as the frequency of the voltage of the supply network 1 and hence also of the auxiliary network 20 remains constant. However, most power networks are maintained at constant frequency by suitable regulating apparatus at the generating station and hence satisfactory operation of the motor speed control system according to the present invention can be expected.

The adjustable transmissions 5a, 5b interposed between the drive motors and their tachometer type generators facilitate matching of the generator frequency to the network frequency and are specially useful for installations where the drive motors must be operated at different but yet constant speeds so that their speed ratio remains constant. However, the transmissions 5a, 5b are not indispensable and may, in some special cases, be omitted in the drive connection between the motor and the generator driven thereby.

While the speed control system which has been described functions exceedingly well for normal variation in motor loads which is of course the usual cause of the change in motor speed, it does have some limitations similar to those found in synchronous motor controls in that the system will drop out of step when the angle $\beta$ falls below 90° or exceeds 270°. However, this condition will not arise unless the load on a particular motor should increase to a wholly unexpected abnormal level.

To dampen any "hunting" effect that may arise in the control system due to load shocks and voltage changes, the main exciter field of the tachometer generators 6a, 6b can be compounded with an auxiliary field whose magnetic axis is displaced from that of the main field by 90°. This auxiliary field is produced by an auxiliary current proportional to the time rate at which the armature, i. e. load current of the drive motors 6a, 6b changes. For a steady state condition of the load current, such auxiliary current would therefore be zero. In the embodiment illustrated, the auxiliary current is introduced into the supply circuit for the field windings of the generators 6a, 6b by induction in a "secondary" winding 12a on a smoothing choke 12 connected in the armature circuit of the motor. The end terminals of the "secondary" 12a are connected in a closed loop circuit consisting of resistors 15 and the two branches $b$ and $c$ of the three-phase field winding of the generator, all connected in series, and the branches $b$, $c$ are displaced from one another by 120°. The auxiliary field producing current traverses this loop circuit and the main field current flows from one side of the auxiliary direct current source 19 through field winding branch $a$, then in parallel paths through branches $b$, $c$, resistors 15 and the two halves of "secondary" 12a to the center tap thereon, and then from the latter to the other side of source 19.

It will be remembered that the control system according to the invention will not function properly if the phase lag of the voltage $U_{T0}$ produced by the tachometer generator 6a, 6b relative to the voltage $U_N$ of the reference network 20 is less than 90° or greater than 270°. Since in starting the drive motors 4a, 4b the difference in phase cannot help but fall outside of the 90°–270° range, due to the continuous voltage and frequency changes in the generators 6a, 6b while the latter are being brought up to normal speed, the running speed control of the invention must be replaced with an auxiliary control voltage applied to the grid control resistor 7 during the starting period. In the present embodiment, such voltage is supplied from an auto-transformer 16 working off the auxiliary alternating current network 20, and the voltage from this transformer is fed to control resistor 7 via switch 14 when the latter occupies the position shown in broken lines. After the motors 4a, 4b are brought up to running speed at which time the combined voltage of network 20 and generators 6a, 6b will be equal to that from auto-transformer 16, switch 14 can be thrown to the position shown in solid lines whereupon the speed control according to the invention will take over and maintain the drive motors 4a, 4b at their proper speeds. A voltmeter 21 connected to the alternative sources of control voltage can be utilized to determine the instant at which the two voltages are equal, at which time the reading on meter 21 will of course be zero. Starting of all motors 4a, 4b, etc. is effected simultaneously by means of transformer 17, the output voltage of which can be varied from zero upward so that a correspondingly variable voltage is likewise available at the armature of each of the drive motors.

In the illustrated embodiment, the novel, frequency dependent control voltage $U_{so}$ is utilized to correct a deviation in speed of the motors 4a, 4b from the desired speed by increasing or decreasing, as the case may require, the current supplied to the armature element of the motor. However, since the speed of a direct current motor may also be changed by varying the excitation of the main field winding, it will be evident that the control voltage $U_{so}$ could be adapted to vary the excitation windings 10a, 10b on motors 4a, 4b in an automatic manner to correct for deviations in motor speed. Also, there exists the possibility of superimposing upon the novel regulating system which has been described an additional regulative effect to maintain a constant tensile stress on the strip material between the rolls of adjacent stands. Finally, in lieu of supplying the control voltage $U_{so}$ directly to the control grids of the rectifier tubes 3a, 3b, etc. as presently illustrated, the voltage $U_{so}$ can be applied indirectly through devices of known construction which produce control impulses having a steep wave front.

I claim:

1. In a system for operating a direct current motor at a selected speed, said motor having armature and field elements, the combination comprising a source of alternating voltage having a constant frequency, grid-controlled rectifier means connected between said source of alternating voltage and one of the elements of said motor for supplying direct current thereto, an alternating voltage generator driven by said motor, the frequency of the voltage developed by said generator being equal to that of said source when said motor is running at said selected speed but displaced in phase therefrom by an angle within the range of 90° to 270°, said phase angle being changed automatically with a deviation in the speed of said motor from said selected speed, circuit means connecting said source and generator voltages directly in series to produce a control voltage equal to their vector sum and circuit means connecting said control voltage directly to the grid of said rectifier means.

2. A system of speed control as defined in claim 1 wherein said rectifier means is connected in the armature circuit of said motor.

3. A system of speed control as defined in claim 1 wherein the field winding of said motor driven generator comprises two winding elements displaced magnetically from each other, and which further includes means supplying one of said winding elements with a direct current of constant amplitude, and means supplying the other of said winding elements with a direct current whose amplitude is proportional to the rate-of-change of the motor current supplied by said rectifier means.

4. A system of speed control as defined in claim 1 and which further includes an auxiliary source of alternating voltage for controlling the grid of said rectifier means, and switching means selectively operable to connect one or the other of said control voltages as the grid control.

5. A system of speed control as defined in claim 1 wherein said rectifier means is connected in the armature circuit of said motor, said armature circuit includes a smoothing choke therein having an auxiliary winding inductively coupled thereto, the field winding of said motor driven generator comprises two winding elements displaced magnetically from each other, means supplying one of said winding elements with a direct current of constant amplitude, and circuit means connecting the auxiliary winding on said smoothing choke to the other of said winding elements.

References Cited in the file of this patent

UNITED STATES PATENTS

| Number | Name | Date |
|---|---|---|
| 1,987,720 | Staege | Jan. 15, 1935 |
| 2,411,745 | Moyer | Nov. 26, 1946 |
| 2,448,793 | Glass | Sept. 7, 1948 |
| 2,471,916 | Volz | May 31, 1949 |